US009170822B1

(12) United States Patent  (10) Patent No.: US 9,170,822 B1
Sharkey  (45) Date of Patent: *Oct. 27, 2015

(54) SMART LIMITED FUNCTIONALITY MODE MANAGER (71) Applicant: Google Inc., Mountain View, CA (US)

(72) Inventor: Jeffrey A. Sharkey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/891,821

(22) Filed: May 10, 2013

Related U.S. Application Data

(63) Continuation of application No. 13/223,408, filed on Sep. 1, 2011, now Pat. No. 8,479,035.

(60) Provisional application No. 61/379,555, filed on Sep. 2, 2010.

(51) Int. Cl.
G06F 9/44 (2006.01)
G06F 1/32 (2006.01)

(52) U.S. Cl.
CPC ............ G06F 9/4401 (2013.01); G06F 1/3228 (2013.01)

(58) Field of Classification Search
CPC ..... G06F 1/3228; G06F 1/266; G06F 1/3203; G06F 1/329
USPC .......................................... 713/100, 320, 324
See application file for complete search history.

(56) References Cited

U.S. PATENT DOCUMENTS 5,717,934 A * 2/1998 Pitt et al. ........................ 713/330
6,369,466 B1 * 4/2002 Murphy ......................... 307/125
6,412,074 B1 6/2002 Flannery
7,636,548 B2 * 12/2009 Kraft et al. .................... 455/41.2
8,245,066 B1 8/2012 Sharkey
2002/0085008 A1 * 7/2002 Jain et al. ....................... 345/520
2004/0076177 A1 4/2004 Koch et al.
2004/0228460 A1 11/2004 Keramane
2005/0064911 A1 3/2005 Chen et al.
2006/0046704 A1 3/2006 Hori et al.

(Continued)

OTHER PUBLICATIONS

Notice of Allowance issued in U.S. Appl. No. 13/223,408 on May 30, 2013, 10 pages.

(Continued)

Primary Examiner — Jaweed A Abbaszadeh
Assistant Examiner — Alyaa T Mazyad
(74) Attorney, Agent, or Firm — Fish & Richardson P.C.

(57) ABSTRACT

Methods, systems, and apparatuses, including computer programs encoded on a computer storage media, for entering a limited functionality mode on a mobile device. In one aspect, a method includes receiving, at a portable electronic device, a first signal instructing the portable electronic device to enter a limited functionality mode, in which one or more transmission functionalities associated with the portable electronic device are disabled, determining whether the portable electronic device has received a second signal instructing the device to immediately enter the limited functionality mode, in response to receiving the first signal, waiting until one or more tasks that use the transmission functionalities are completed or until the second signal is determined to have been received, and entering the limited functionality mode after waiting until the one or more tasks that use the transmission functionalities are completed or until the second signal is determined to have been received.

18 Claims, 3 Drawing Sheets

(56) References Cited

U.S. PATENT DOCUMENTS

| | | |
|---|---|---|
| 2006/0047980 A1* | 3/2006 | Price et al. .................... 713/300 |
| 2007/0098173 A1 | 5/2007 | Rajakallio |
| 2007/0234086 A1 | 10/2007 | Bernstein et al. |
| 2007/0274277 A1 | 11/2007 | Koizumi et al. |
| 2008/0002638 A1 | 1/2008 | Saarela |
| 2008/0057876 A1 | 3/2008 | Hsia et al. |
| 2009/0186633 A1 | 7/2009 | Yonker et al. |
| 2009/0253455 A1 | 10/2009 | Huang |
| 2010/0083387 A1* | 4/2010 | Rodgers et al. ................. 726/36 |
| 2010/0099354 A1 | 4/2010 | Johnson |
| 2010/0100590 A1 | 4/2010 | Palay et al. |
| 2010/0279627 A1 | 11/2010 | Bradley |
| 2010/0287422 A1* | 11/2010 | Miyazaki ........................ 714/55 |
| 2011/0022859 A1* | 1/2011 | More et al. .................... 713/300 |
| 2011/0107129 A1* | 5/2011 | Sinykin et al. ................. 713/322 |
| 2012/0238851 A1* | 9/2012 | Kamen et al. .................. 600/365 |

OTHER PUBLICATIONS

Office Action issued in U.S. Appl. No. 13/250,147 on Jan. 26, 2012, 9 pages.

Notice of Allowance issued in U.S. Appl. No. 13/250,147 on May 22, 2012, 5 pages.

Office Action issued in U.S. Appl. No. 13/223,408 on Apr. 23, 2013, 14 pages.

* cited by examiner

SMART LIMITED FUNCTIONALITY MODE MANAGER

CROSS REFERENCE TO RELATED APPLICATIONS

This patent application is a continuation of U.S. patent application Ser. No. 13/223,408, filed Sep. 1, 2011, which claims the benefit of priority of U.S. Provisional Patent Application No. 61/379,555, filed Sep. 2, 2010, the entirety of which are incorporated by reference.

BACKGROUND

Upon boarding an airplane, passengers typically have to disable the transmission functionalities of their mobile devices. These transmission functionalities may be disabled, for example, by simply powering off a device. Alternatively, some mobile devices also have "limited functionality" modes, sometimes referred to as "flight mode" or "airplane mode," in which the mobile device itself remain powered on, but any transmission functionalities of the device are powered off or are otherwise disabled. These limited functionality modes allow users to retain access to local functions of the mobile device (e.g., applications stored or executing on the mobile device) without transmitting data that may, for example, potentially interfere with the airplane's communication and navigation sub-systems.

SUMMARY

In general, one innovative aspect of the subject matter described in this disclosure may be embodied in methods for receiving, at a portable electronic device, a first signal that instructs the portable electronic device to enter a limited functionality mode, wherein, in the limited functionality mode, one or more transmission functionalities associated with the portable electronic device are disabled, determining whether the portable electronic device has received a second signal that instructs the portable electronic device to immediately enter the limited functionality mode, in response to receiving the first signal, waiting until one or more tasks that use the one or more transmission functionalities are completed or until the second signal is determined to have been received; and entering the limited functionality mode after waiting until the one or more tasks that user the one or more transmission functionalities are completed or until the second signal is determined to have been received.

In general, in another innovative aspect of the subject matter described in this specification may be embodied in methods for receiving, at a portable electronic device, a first signal that instructs the portable electronic device to enter a limited functionality mode, wherein, in the limited functionality mode, one or more transmission functionalities associated with the portable electronic device are disabled; determining whether the portable electronic device has received a second signal that instructs the portable electronic device to immediately enter the limited functionality mode, the second signal being associated with an activation of a control presented on a user interface associated with the portable electronic device; in response to receiving the first signal, waiting until one or more tasks that use the one or more transmission functionalities are completed or until the second signal is determined to have been received; and entering the limited functionality mode after waiting until the one or more tasks that user the one or more transmission functionalities are completed or until the second signal is determined to have been received.

In general, one innovative aspect of the subject matter described in this disclosure may be embodied in a portable electronic device that includes an input device, one or more processing devices, and a computer-readable medium having instructions stored thereon which, when executed by the one or more processing devices, cause the portable electronic device to receive a first signal associated with the input device that instructs the portable electronic device to enter a limited functionality mode, wherein, in the limited functionality mode, one or more transmission functionalities associated with the portable electronic device are disabled, determine whether the portable electronic device has received a second signal associated with the input device that instructs the portable electronic device to immediately enter the limited functionality mode, in response to receiving the first signal, wait until one or more tasks that use the one or more transmission functionalities are completed or until the second signal is determined to have been received, and enter the limited functionality mode after waiting until the one or more tasks that user the one or more transmission functionalities are completed or until the second signal is determined to have been received.

Other aspects of these aspects include corresponding systems, apparatus, and computer programs, configured to perform the actions of the methods, encoded on computer storage devices.

These and other aspects may each optionally include one or more of the following features. For instance, the actions include presenting a control that, when selected, causes the portable electronic device to immediately enter the limited functionality mode; the actions include presenting a control that, when selected prevents the portable electronic device from entering the limited functionality mode; the actions include pausing an active download of data from a remote source; the actions include downloading data from a remote data source; the actions include synchronizing data on the portable electronic device with data stored in a remote data source; an order in which the one or more tasks are performed is configurable by a user; the actions include determining whether to perform a task based at least in part on an estimated time of completion for the task; the actions include comparing the estimated time of completion to a threshold; the actions include altering a pending download of one or more first files from a remote source; the actions include causing the portable electronic device to download one or more second files that are smaller in size that the one or more first files; the actions include disabling one or more transmitters associated with the portable electronic device; the actions include receiving the instruction to enter the limited functionality mode as user input; the actions include waiting until one or more pending downloads have completed before entering the limited functionality mode; the actions include initiating a download of data stored in a remote data source prior to entering the limited functionality mode; the actions include providing an indication that one of the one or more tasks will not be completed prior to entering the limited functionality mode; and/or the actions include detecting, by the portable electronic device, one or more attributes of a network connection, and determining, based at least in part on the one or more attributes, which of the one or more tasks may be completed.

The details of one or more aspects of the subject matter described in this disclosure are set forth in the accompanying drawings and the description below. Other potential features,

BRIEF DESCRIPTION OF THE DRAWINGS

Like reference symbols in the various drawings indicate like elements.

DETAILED DESCRIPTION

Figure 1:
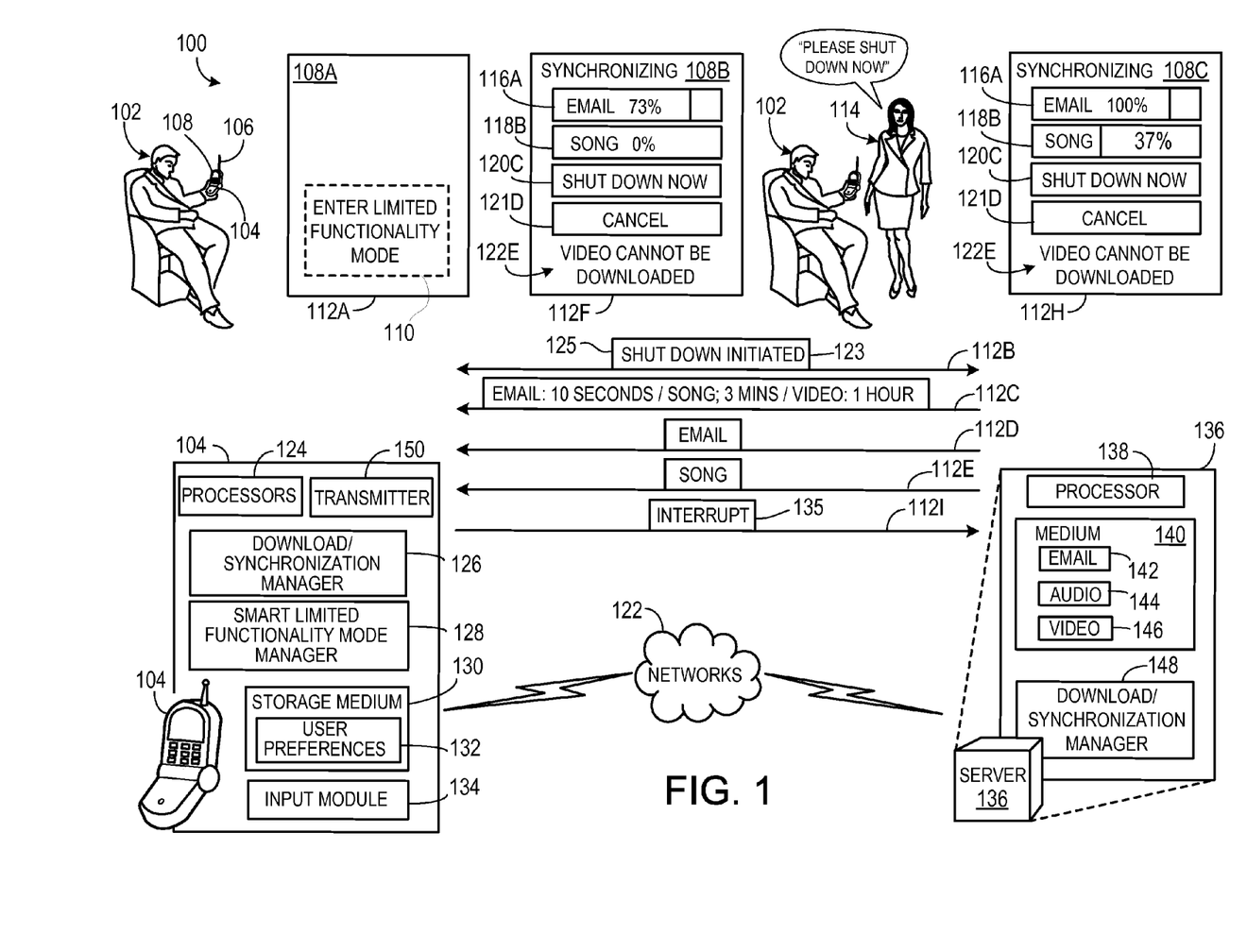
FIG. 1 is a diagram of a system that manages the transmission functionality of the mobile device using a smart limited functionality mode manager.

FIG. 1 is a diagram of a system 100 that manages the transmission functionality of a mobile device 104 using a smart limited functionality mode manager 128. FIG. 1 also illustrates a flow of data within the system 100 during states 112A-I, as well as a user interfaces 108A-C that are displayed on the mobile device 104 during states 112A, 112F, and 112H, respectively. In practice, the states 112A-I may occur in the illustrated sequence, or they may occur in a sequence that is different than the illustrated sequence.

Briefly, and as contrasted with a "normal" or "dumb" limited functionality mode manager, a mobile device that includes a "smart" limited functionality mode manager allows one or more tasks that require the use of the transmission functionality of the mobile device to be completed (in the case of a pending task) or accomplished (in the case of a task that has not yet started) after the user instructs the mobile device to enter the limited functionality mode, and before the transmission functionality of the mobile device is actually disabled. In doing so, the smart limited functionality mode manager selects tasks to perform based on whether they can be completed or accomplished within a predefined or dynamically determined period of time.

Furthermore, as used by this disclosure, "transmission functionalities" of a mobile device refer to any functionality that relates to the sending, propagating or receiving of analog or digital data over a physical point-to-point or point-to-multipoint transmission medium, through either wired or wireless connections. For example, a mobile device may use transmission functionalities when it transmits data over a BLUETOOTH® or WiFi connection, or when it receives radio (e.g., cellular), television or Global Positioning System (GPS) signals. A mobile device may disable a transmission functionality by, for example, severing a network connection, turning off or otherwise disabling a hardware module (e.g., a transmitter) or a software application (e.g., a communication or navigation application), by instructing a hardware module or a software application to cease transmitting, or using other approaches.

By delaying the disabling of transmission functionalities for a period of time after the user instructs the mobile device to enter the limited functionality mode, the transmission functionalities of the mobile device still eventually become disabled, however the smart limited functionality mode manager may allow a limited amount of data to be transferred, and/or may prevent the transmission of certain data from being terminated prematurely. When the user will not be able to access the transmission functionalities of a mobile device for a long period of time, for example when the user is preparing to board an aircraft on an intercontinental flight or is entering a secure facility, the additional data that is received after the limited functionality mode is instructed may keep the mobile device relatively up-to-date, while avoiding unnecessary, unwanted or unimportant data transfers, and may allow the user to comply with all necessary safety regulations and official instructions.

Referring to the system 100 illustrated in FIG. 1, the mobile device 104 (e.g., a cellular telephone, a PDA, a personal computer, a music player, a tablet computer, an e-book reader, or other processing device) is in communication with a server 136 over one or more networks 122. The networks 122 may include a wireless cellular network, a wireless local area network (WLAN) or Wi-Fi network, a Third Generation (3G) or Fourth Generation (4G) mobile telecommunications network, a 2G or 2.5G (EDGE) mobile telecommunications network, a private network such as an intranet, a public network such as the Internet, or any appropriate combination thereof.

The mobile device 104 includes one or more processors 124 for executing instructions, and at least one storage medium 130 for storing data such as user preferences 132. A user 102 of the mobile device 104 may operate and control the mobile device 104 using at least one input module 134 (e.g., a keyboard, a mouse, a trackball, or a touch screen). The mobile device 104 also includes a transmitter 150 for encoding and decoding data, and an antenna 106 for wirelessly transmitting and receiving radio frequency (RF) or other signals that carry the data.

The mobile device 104 includes a smart limited functionality mode manager 128, which may be implemented as software executed on processor 124, hardware, or a combination thereof. Among other functions, the smart limited functionality mode manager 128 controls the transmission functionality of the mobile device 104. For example, upon receiving an instruction (e.g., from a user 102 using the input device 134), the smart limited functionality mode manager 128 may enable or disable the transmitter 150 and/or the antenna 106. The mobile device 104 also includes a download/synchronization manager 126, which may be implemented as software executed on processor 124, hardware, or a combination thereof, that controls the transfer of data between the server 136 and the mobile device 104.

The server 136 may include one or more processors 138 and a storage medium 140 that stores various files, resources and other data, such as email data 142, audio data 144 (e.g., "song" data), and video data 146. The server 136 includes download/synchronization manager 148, which may be implemented as software executed on processor 138, hardware, or a combination thereof. The server 136 may be configured to transfer data to and from the mobile device 104 over the networks 122 using the download/synchronization manager 148.

In the system 100, the mobile device 104 is configured to upload or download data, such as the email data 142, audio data 144, and the video data 146, to and from the server 136. In some examples, once the server 136 has received a download request from the mobile device 104, the download/synchronization manager 148 may coordinate with the download/synchronization manager 126 to begin transferring the requested data.

During state 112A, the transmission functionality of the mobile device 104 is enabled, and the smart limited functionality mode manager 128 allows the transmitter 150 and antenna 106 to wirelessly transmit data to the server 136. Among other controls, the user interface 108A of the mobile device 104 displays a limited functionality control 110. The user 102 may choose to select the control 110 when they board an airplane or enter a secure facility, when they are preparing to board an airplane or enter a secure facility, when they are instructed to power off the mobile device 104 by officials, or any other time before the limited functionality mode is required.

During state 112B, after the user 102 selects the control 110, the smart limited functionality mode manager 128 analyzes the state of the mobile device 104, the networks 122, and/or the server 136. For example, the smart limited functionality mode manager 128 may determine the bandwidth of the network connection of the mobile device 104, or the status of any active or possible synchronizations, uploads or downloads.

The smart limited functionality mode manager 128 determines what (if any) tasks should be completed prior to entering limited functionality mode. The smart limited functionality mode manager 128 may perform this determination using information received from the download/synchronization managers 126, 148, such as information relating to the time required to complete the tasks. The download/synchronization managers 126, 148 can determine, individually or together, a set of tasks to potentially perform, along with characteristics associated with each task. For example, one or both of the download/synchronization managers 126, 148 can determine whether any audio, video, or email data transfers are pending or scheduled to be initiated, and can also calculate an estimated time to complete each transfer. The download/synchronization managers 126, 148 can also communicate in order to complete the tasks, and can physically effect the transmission of data between the mobile device 104 and the server 136 (e.g., the download/synchronization manager 126 can manage the downloading of email data from the download/synchronization manager 148).

If the smart limited functionality mode manager 128 determines, for example, that a task (e.g., the downloading of data from the server 136) can be completed within a short period of time after the limited functionality mode is initiated, the smart limited functionality mode manager 128 may allow the task to complete before instructing the mobile device 104 to enter the limited functionality mode. Such action may allow a limited amount of data to be transferred to or from the mobile device, and/or may prevent a data transfer that is near completion from being prematurely terminated. The smart limited functionality mode manager 128 may also access user preferences 132 or other prioritizing information in determining which tasks to perform prior to entering the limited functionality mode. For example, if the user preferences 132 indicate that no task should be completed that involves transferring more than 100 megabytes of data, the smart limited functionality mode manager 128 will not perform tasks meeting this criterion.

When the smart limited functionality mode manager 128 determines that the conditions of the mobile device 108, networks 122, or server 136 are such that no additional data may or should to be transferred to or from the server 136, the smart limited functionality mode manager 128 may instruct the mobile device 104 to immediately enter the limited functionality mode and to disable its transmission functionalities, without waiting an additional period of time before doing so.

In some implementations, the smart limited functionality mode manager 128 may instruct the mobile device 104 to immediately enter the limited functionality mode when the data will take more than a specified period of time to be communicated (e.g., 1 second, 5 seconds, 30 seconds, 1 minute, 5 minutes, or 15 minutes), when the data is not assigned a sufficient priority or importance level, when user preferences indicate that the data is not to be communicated, or when an external signal (e.g., provided by the user 102, the download synchronization manager 148, or some other source) indicates that that the mobile device 104 should immediately enter the limited functionality mode. In other implementations, the determination by the smart limited functionality mode manager 128 to immediately enter, or to delay entering, the limited functionality mode may occur based on estimating an urgency of the limited functionality mode, for example by examining a database (e.g., a schedule of the user 102, or a real-time flight schedule) to determine whether the user is scheduled to immediately depart on a flight, or whether the departure is scheduled to occur more than a predetermined period of time in the future.

The smart limited functionality mode manager 128 may instruct the download/synchronization manager 126 to determine whether the mobile device 104 is synchronized with the server 136, for example to confirm that the user's 102 email account is up-to-date or to confirm that there is no data that is queued for download by the mobile device 104 at the server 136. When the smart limited functionality mode manager 128 determines that some data may or should still be downloaded, the transmission functionalities of the mobile device 104 are not immediately disabled, but rather the smart limited functionality mode manager 128 determines a delay period of time before the limited functionality mode is to be entered.

In determining the delay period of time, the smart limited functionality mode manager 128 may determine an amount of data that can be, or that should be, uploaded to or downloaded from the server 136. For example, the smart limited functionality mode manager 128 may send a message 123 to the download/synchronization manager 148 on the server 136, to determine an amount of email data 142, song data 144, and/or video data 144 that is queued at the server 136, and may compare that amount to the bandwidth of the network connection. In determining the delay period of time, the mobile device 104 may also determine an amount of data that is currently being uploaded to or downloaded from remote server 136. In FIG. 1, the smart limited functionality mode manager 128 selects a delay period of time of five minutes to delay the entry of the limited functionality mode.

During state 112C, the mobile device 104 receives a communication 125 from the download/synchronization manager 148 that indicates the amount of data that remains to be transferred to or from the server 136, and/or the approximate time the transfers will take to accomplish or complete based on the current conditions of the mobile device 104, server 136, or networks 122. In some examples, the download/synchronization manager 148 calculates the amount of data remaining to be transferred to or from the server 136 from the mobile device 104 by exchanging communications with the download/synchronization manager 126 of the mobile device 104. The communication 125 may be received, for example from the server 136, or from program or circuit of the mobile device 104.

The communication 125 indicates that the email data 142 will require ten additional seconds to download, that the song data 144 will require three additional minutes to download, and that the video data 146 will require one additional hour to download. If the amount of time that would be required to download all of the data (i.e., ten seconds plus three minutes plus one hours) exceeds a threshold (i.e., five minutes), the smart limited functionality mode manager 128 may select some subset of the tasks to accomplish or complete, and may recalculate the amount of time that would be required to accomplish or complete the subset of tasks. Selecting the subset of the tasks to accomplish or complete may include excluding the most time-consuming task(s), or excluding the task(s) assigned a lowest importance or relevance score. The selection of subsets can change dynamically based on a change in network conditions, user preferences, user input, or other factors.

In the FIG. 1 example, because the smart limited functionality mode manager 128 has selected a delay period of five minutes, and because the email data 142 requires only ten seconds to complete downloading, the smart limited functionality mode manager 128 allows the mobile device 104 to complete the download of email data 142. Similarly, because the song data 144 requires only three minutes to complete downloading, the smart limited functionality mode manager 128 allows the mobile device 104 to complete the download of the song data 144. Because the video data requires one hour to complete downloading, the smart limited functionality mode manager 128 does not allow the mobile device 104 to complete the download of the video data 146. In some examples, the smart limited functionality mode manager 128 may cause two or more tasks to be downloaded and/or uploaded in parallel. For example, in some situations, email data 142 could be downloaded at the same time as the song data 144.

In addition to or instead of being based on time, the determination to not allow a download to complete may be based on other factors, such as user preferences, file type priorities, or based on a limit on the total number or size of files to be downloaded. The type, amount, or size of the data downloaded may be altered according to stored user preferences or detected network conditions. For example, the mobile device 104 may store user preferences 132 on the storage medium 130 that affect the decision of whether to download data, or the order in which the data should be downloaded. The user 102 may alter the download priority level of different types of data, may set download time and size limits, and may select particular files to download prior to disabling transmission functionality. Furthermore, a user may elect to download a file that contains similar content to a file that is scheduled to be or is currently being downloaded. For example, if the user 102 is downloading a high-quality video file to the mobile device 104 and the mobile device 104 begins to enter the limited functionality mode, the mobile device 104 may be instructed (either by the user 102 or automatically) to begin downloading a lower-quality video (e.g., a smaller file) that corresponds to the content of the high-quality video. Similar operations may be performed with regard to music files, photographs, and other types of data.

During state 112D, the smart limited functionality mode manager 128 delays the entry of the limited functionality mode to allow the email data 142 to being and/or complete updating (e.g., downloading and uploading email pending or new email messages). During state 112E, the smart limited functionality mode manager 128 delays the entry of the limited functionality mode to allow the song data 144 to complete downloading.

The mobile device 104 displays the user interface 108B during state 112F, which occurs at a time before the completion of the transfer of the email data 142. The user interface 108B includes an email download progress bar 116A, a song download progress bar 118A, and a message 112 that references the video data 146, which the smart limited functionality mode manager 128 has determined will not or cannot be transferred before the limited functionality mode will be entered. The progress of any downloads may be graphically illustrated using the progress bars 116 and 118 in real-time or near-real-time to receiving the email data 142 and the song data 144, respectively.

The user interface 108B also displays an immediate shut down control 120 (in the figure, "shut down now") and a cancel control 121. Like the limited functionality control 110, the user 102 may activate either of the controls 120, 121 by pressing a key on a keyboard when a cursor is positioned on or over the respective control. Activation of the cancel control 121 may cause the mobile device 102 to abort its entry into flight mode and return to normal operation, or "full" functionality mode, in which any disabled transmission functionalities are re-enabled. The outstanding data may continue to be downloaded, and any data excluded from download based on priority settings, user preferences, or other determination algorithms may be downloaded as usual.

During state 112G, a circumstance arises that requires the user 102 to immediately disable transmission functionality, before all the pending download tasks are completed. For instance, a flight attendant 114 has ordered the user 102 to immediately disable the transmission functionality of the mobile device 104 because the aircraft in which the user 102 is sitting is preparing to depart.

In state 112H, after the flight attendant has ordered the user 102 to immediately disable the transmission functionality, the progress bar 116B on the user interface 108C indicates that the transfer of the email data 116 has been completed, but that the transfer of the song data is only 37% completed. Pursuant to the instructions of the flight attendant 114, the user may activate the immediate shut down control 120.

Activation of the immediate shut down control 120 results in a transition to state 112I, in which the smart limited functionality mode manager 128 disables one or more transmission functionalities of the mobile device 104. For example, the smart limited functionality mode manager 128 instructs the mobile device 104 to transmit an interrupt message 135 to the server 136 (e.g., to the download/synchronization manager 148 of the server 136). Upon receiving the interrupt message 135, the download/synchronization manager 148 may immediately cancel or pause the transmission of the song data 144, and disables the transmission functionality of the mobile device 104. The partial song data that has been downloaded may be stored on storage medium 130, and the download of the remaining song data 144 may resume once the transmission functionality of the mobile device 104 has been reactivated.

Figure 2:
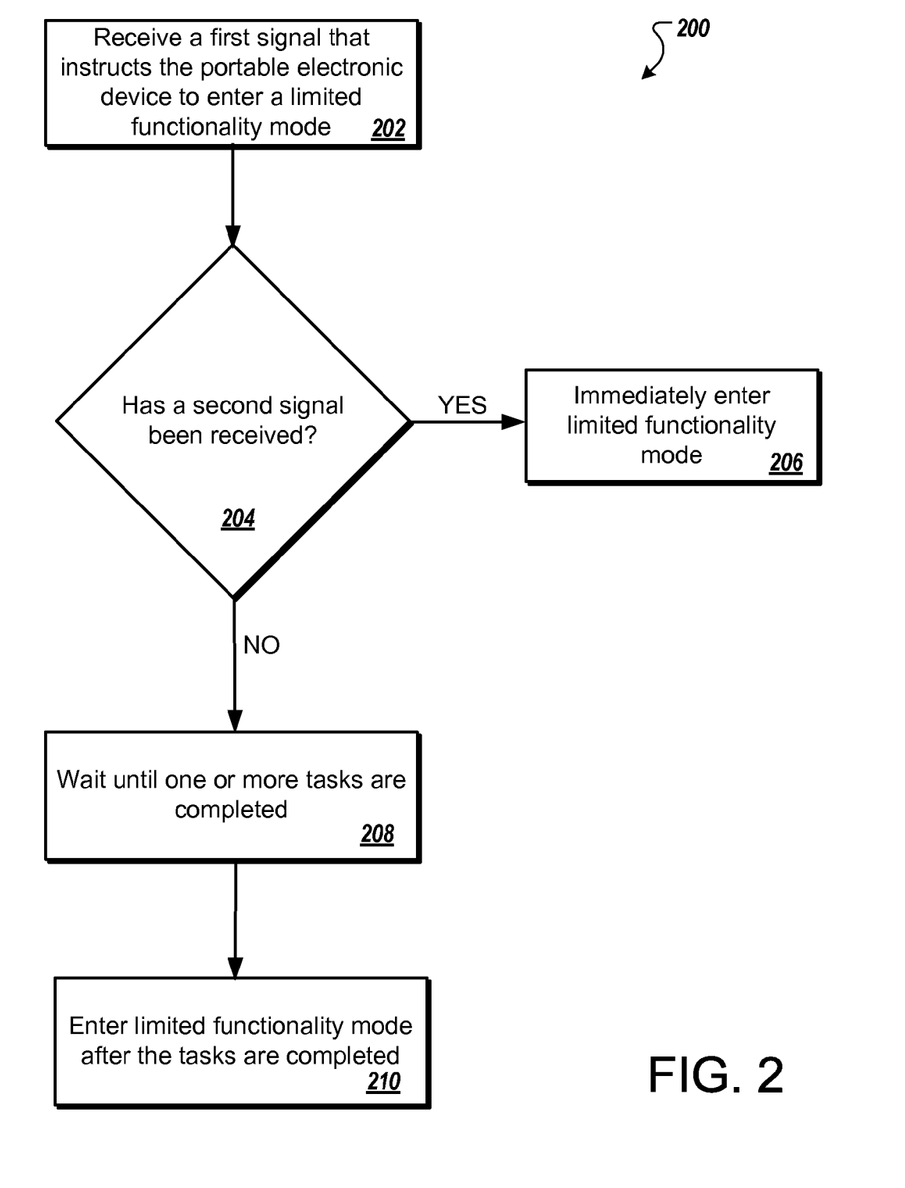
FIG. 2 is a flowchart of a process.

FIG. 2 is a flowchart of a process 200. Briefly, the process 200 includes receiving a first signal that instructs the portable electronic device to enter a limited functionality mode and determining whether a second signal has been received. When the second signal has been received, the mobile electronic device immediately enters the limited functionality mode. When the second signal is not received, the mobile device waits until one or more tasks are completed before entering the limited functionality mode. Some operations associated with the process 200 may be performed by one or more of the download synchronization manager 126, the processors 124, the limited functionality mode manager 128, or other hardware or software components not shown.

In more detail, when process 200 begins, a signal is received that instructs the mobile device to enter a limited functionality mode (202). The signal may be generated in response to a user input (e.g., by activating a control on a user interface using an input device (see, e.g., FIG. 1)), or may be generated automatically in response to an event (e.g., the signal may be generated in response to receiving a signal broadcast on an airplane that causes all onboard mobile devices to begin entering a flight mode). The signal may also be generated in response to a determination that a user has entered the vicinity (e.g., defined by a threshold distance) of an airport, or a determination that a user is entering (or is about to enter) an area with poor cellular coverage. In some examples, these trigger events may cause the mobile device to prepare to enter a limited functionality mode, but may not actually trigger full entry into the mode (e.g., the functions enabled on the mobile device may not change).

As described above, the limited functionality mode may be a mode in which one or more transmission functions of the mobile device are disabled. For example, entering a limited functionality mode may include disabling one or more transmitters of the mobile device. In some examples, only certain transmitters are disabled, while others remain active; that is, a long-range radio transmitter may be disabled, but a Bluetooth or WiFi transmitter may remain active. Furthermore, disabling transmission functionality may not require that the actual transmission hardware be disabled; rather, disabling transmission functionality may also include altering the states of one or more software applications running on the mobile device that prevent one or more transmitters from actually transmitting data.

It is determined whether a second signal has been received (204). Like the first signal, the second signal may be generated based on a user input (e.g., by activating a control on a user interface using an input device, or may be generated automatically in response to an event (e.g., the signal may be generated in response to receiving a signal broadcast on an airplane that causes all onboard mobile devices to immediately enter a flight mode). The second signal can be generated as a result of the actuation of a second control, and can also be generated when a user presses and holds the limited functionality mode control (e.g., control 110) for longer than a certain period of time (e.g. a "long hold," such as holding the control for five seconds could trigger an immediate shut down). In some examples, upon detecting a long hold, communications between the smart limited functionality mode manager and one or more of the download/synchronization managers is delayed until the mobile device 108 determines whether the user 102 is executing a long hold.

In general, the second signal corresponds to a selection of a control by a user that instructs the mobile device to immediately enter the limited functionality mode. If a user activates a control that instructs the mobile device to immediately enter a limited functionality mode, a control signal (the "second signal") is generated that instructs the mobile device to immediately enter the limited functionality mode (e.g., without waiting for any pending tasks to complete) (206). In some implementations, selection of the immediate shut down control may instruct the smart limited functionality mode manager 128 to determine whether any pending transmissions may be completed (or whether any transmissions not yet started may be started and completed) within a very short period of time (e.g., a few seconds), and to delay the entry of the limited functionality mode for this very brief period of time to prevent the premature termination of the transmission. In a further alternative implementation, the mobile device 104 may present a warning or countdown to the user 102 to inform him of the impending disablement of the transmission functionality.

If the second signal is not received, the mobile device waits until one or more tasks are completed before entering the limited functionality mode (208). While the mobile device is performing tasks such as synchronizing email accounts and downloading music files, the mobile device will continuously monitor for a receipt of the second signal. Stated differently, the determination (204) may also take the form of monitoring for a state change relating to the second signal. The default state is that the second signal has not been received, and the one or more tasks are performed as normal. However, receipt of the second signal will trigger a change in state and will force the determination (204) to be performed on demand as a result of the state change.

The one or more tasks to be completed may include: downloading/uploading data that has been assigned a priority score that exceeds a threshold; downloading/uploading data that a user has indicated in their preferences should be downloaded; downloading/uploading data that falls within data size limits; downloading/uploading data that can be transferred within a given period of time; downloading/uploading data according to network or connectivity conditions or attributes.

After the pending tasks have been completed, the mobile device enters the limited functionality mode (210). In some examples, entering the limited functionality mode includes disabling one or more transmission functionalities of the mobile device, such as disabling one or more transmitters associated with the mobile device. Which of the one or more transmitters are disabled may be determined according to default settings or according to user preferences stored on the mobile device or on at a remote location.

In some cases, the approximate time that transfers will take to accomplish or complete may be estimated without transmitting a message to the server 136. For example, in the case of a pending song download, the mobile device 104 may already have access to the total size of the file associated with the pending song download (e.g., by having previously downloaded metadata associated with the audio file), and to the amount of data that has already been downloaded. As such, the mobile device 104 (and in some examples, the download/synchronization manager 126, specifically) may estimate the amount of time that is required to complete the download by comparing this information, and may set this amount of time as the delay period of time.

Figure 3:
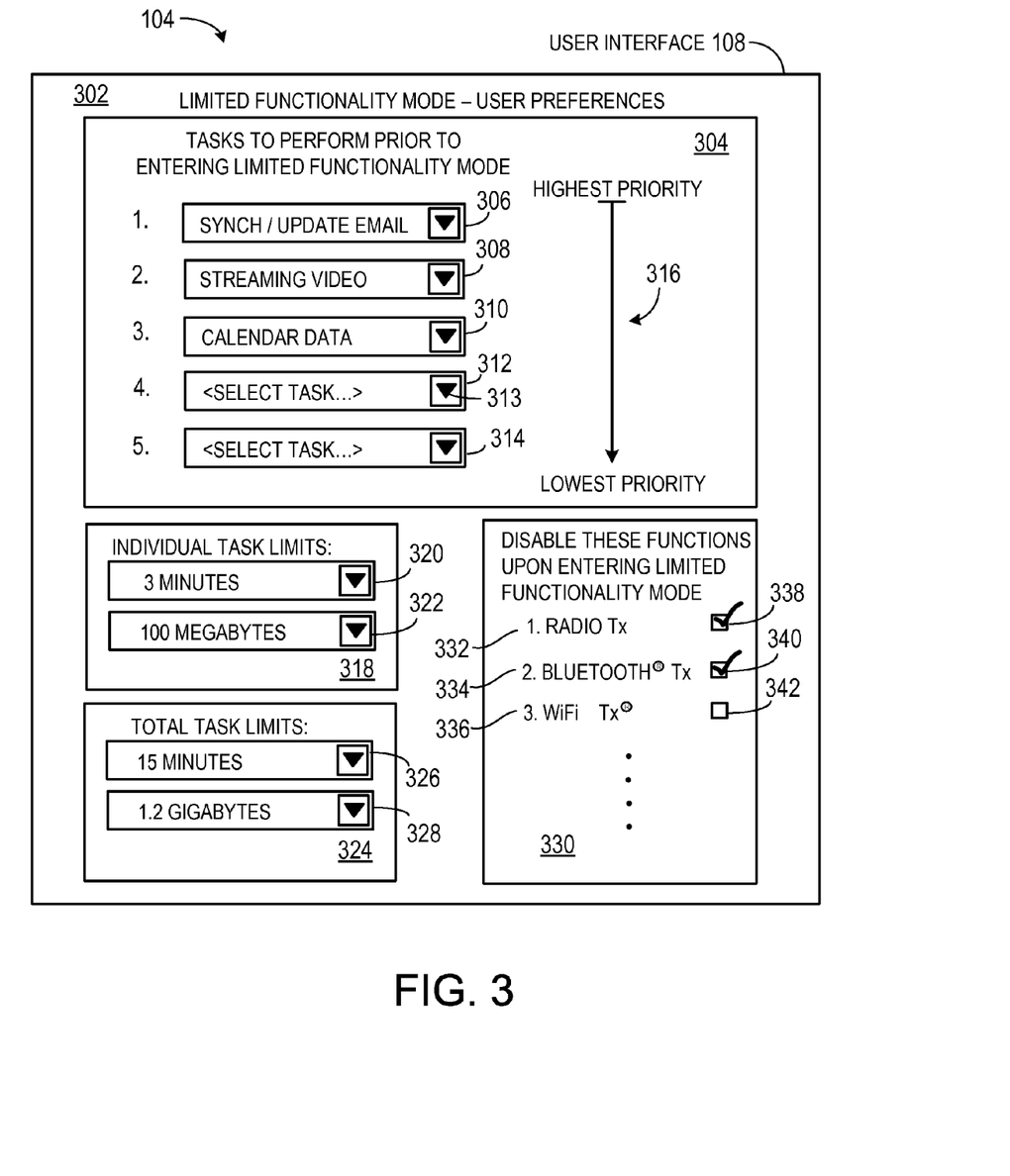
FIG. 3 is a diagram of a mobile device and user interface.

FIG. 3 is a diagram of a settings screen 302. The user interface 302 includes a variety of options and settings that relate to the smart limited functionality mode, including options relating to network tasks that the mobile device 104 will perform prior to disabling transmission functionality. While the information displayed on the settings screen 302 portrays the settings as user-configurable and customizable, any or all of the settings may be made inaccessible to a user. For example, some of the settings may be "grayed-out" (e.g., set to a read-only status) so certain information cannot be altered by a user. In this way, application developers may set pre-defined values for certain settings that cannot be easily modified by a user. Thus, any or all of the controls may not require user input, and may govern the decision of whether to perform certain functions programmatically based on pre-defined parameters.

Settings screen 302 includes a task priority list 304 that includes five slots 306, 308, 310, 312, 314 for network tasks. The tasks are arranged in an order 316 of highest priority to lowest priority with regard to the order in which they are completed prior to entering the limited functionality mode. For example, the highest priority task 306 relates to synchronizing and updating an email account. This task is followed by a streaming media task 308 and a calendar data task 310. Arranging the tasks in this order within the task priority list 304 causes the mobile device 104 to attempt to complete each task in the selected order. In the example of FIG. 3, if a user were to instruct the mobile device to begin entering the limited functionality mode, the mobile device would attempt to first synchronize and update email, then complete the download of any streaming media and update calendar data prior to disabling the transmission functionality.

In some examples, a user may or remove tasks from the task priority list 304 using a variety of interface controls, such as the drop-down style list 313 shown in FIG. 3. Other interface controls include: radio buttons; a stack of elements in which elements representing tasks may be dragged into different orders relative to one another; and the like.

The settings screen 302 also includes controls for other aspects of the smart limited functionality mode. For example, the settings screen 302 may include an individual task limit control 318. The individual task limit control 318 may alter a time limit 320 and/or a size limit 322 associated with individual tasks. In the example of FIG. 3, the individual task limit control 318 shows that limits of three minutes and "100 megabytes" will be applied to individual tasks. With these limits active, any individual task that will require more than three minutes to complete or whose associated data is larger that "100 megabytes" will not be performed prior to disabling the transmission functionality. The time limit 320 may be calculated by the mobile device 104 or by a different network entity based on the mobile device's current network conditions or other factors.

The settings screen 302 may also include a total task limit control 324 that governs the limits placed on the task process as a whole. For example, a similar time limit 326 and a size limit 328 may be applied to the entire task process. In the example of FIG. 3, the total task limit control 324 shows that limits of fifteen minutes and 1.2 gigabytes will be applied to the task process. Thus, the mobile device 104 will attempt to complete all tasks in the task list 304 until the total time to complete the tasks exceeds fifteen minutes, or until the total amount of data to be transferred exceeds 1.2 gigabytes. By using the total task limit control 324, a user (or program designer, network operator, or other entity) may ensure that the mobile device 104 will not attempt to complete tasks for an unreasonable amount of time prior to disabling its transmission functionality.

The settings screen 302 may also include a transmitter control interface 330. The transmitter control interface 330 may govern which of the mobile device's transmitters are disabled when the mobile device 104 enters the limited functionality mode (e.g., after completing one or more of the tasks in the task list 304). The transmitter control interface 330 may list controls for any or all the transmitters or transmission protocols associated with the mobile device 104, such as the radio transmitter control 332, a Bluetooth® transmitter control 334, and a WiFi® transmitter control 336. By activating a control (e.g., by placing a checkmark in a box next to the control), a user may select particular transmission functionalities to be disabled upon entering the limited functionality mode. In the example of FIG. 3, the transmitter control interface 330 shows that upon entering the limited functionality mode, the mobile device 104 will disable its radio transmitter and its Bluetooth® transmitter, but its WiFi® transmitter will remain enabled.

In some examples, a user may also be presented with a screen such as settings screen 302 upon instructing the mobile device 104 to begin entering the limited functionality mode. The controls presented to the user may be similar to those show in FIG. 3 or may present additional options that are more specific (e.g., a user could choose to download specific songs rather than all audio or song data).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Aspects and all of the functional operations described in this disclosure may be implemented in digital electronic circuitry, or in computer software, firmware, or hardware, including the structures disclosed in this disclosure and their structural equivalents, or in combinations of one or more of them. Aspects may be implemented as one or more computer program products, i.e., one or more modules of computer program instructions encoded on a computer-readable medium, tangible storage media, or other non-transitory media, for execution by, or to control the operation of, data processing apparatus. We use the terms computer-readable medium, tangible storage media, and other non-transitory media broadly to include any device apart from, for example, a propagated signal. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Aspects may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular aspects. Certain features that are described in this disclosure in the context of separate aspects may also be implemented in combination in a single aspect. Conversely, various features that are described in the context of a single aspect may also be implemented in multiple aspects separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other type of file. Moreover, where a table or hash table is mentioned, other data structures (such as spreadsheets, relational databases, or structured files) may be used.

Thus, particular aspects have been described. Other aspects are within the scope of the following claims. For example, the actions recited in the claims may be performed in a different order and still achieve desirable results.

What is claimed is:

1. A computer-implemented method comprising:
   determining, by one or more processors, a likely aircraft departure time based on accessing a real-time flight schedule database;
   determining, by the one or more processors, a duration of a delay period for delaying activation of a mode of a mobile device in which the mobile device remains powered on, but in which one or more transmission functionalities of the mobile device are restricted, based, at least in part, on (i) a time required for at least one task to complete one or more transmissions using the transmission functionalities of the mobile device, (ii) a specified maximum length of time, and (iii) the likely aircraft departure time;
   delaying for the determined duration of the delay period, the activation of the mode of the mobile device in which the mobile device remains powered on, but in which the transmission functionalities of the mobile device are restricted; and
   after delaying activation of the mode for the determined duration of the delay period, activating the mode of the mobile device in which the mobile device remains powered on, but in which the transmission functionalities of the mobile device are restricted.

2. The method of claim 1, wherein the duration of the delay period is determined based further on (i) an available bandwidth, (ii) a user preference, (iii) a synchronization status, or (iv) an urgency associated with the mode.

3. The method of claim 1, wherein the duration of the delay period is determined further based on an amount of data remaining to be uploaded to or downloaded from a server.

4. The method of claim 1, wherein activating the mode of the mobile device in which the mobile device remains powered on, but in which the transmission functionalities of the mobile device are restricted, comprises disabling the transmission functionalities of the mobile device by (i) disabling one or more hardware transmitters of the mobile device, or (ii) altering a state of one or more software applications running on the mobile device.

5. The method of claim 1, wherein delaying, for the determined duration of the delay period, the activation of the mode of the mobile device in which the mobile device remains powered on, but in which the transmission functionalities of the mobile device are restricted, comprises delaying the activation of an airplane mode of the mobile device.

6. The method of claim 1, comprising:
   receiving data indicating a user selection of the mode,
   wherein the mode is activated at least the duration of the delay period after receiving the data indicating the user selection of the mode.

7. The method of claim 1, wherein determining the duration of the delay period comprises:
   determining that the time for the at least one task to complete the one or more transmissions is shorter than the specified maximum length of time; and
   based on determining that the time for the at least one task to complete the one or more transmissions is shorter than the specified maximum length of time, determining the duration of the delay period to be the time for the at least one task to complete the one or more transmissions.

8. The method of claim 1, wherein determining the duration of the delay period comprises:
   determining that the specified maximum length of time is shorter than the time for the at least one task to complete the one or more transmissions; and
   based on determining that the specified maximum length of time is shorter than the time for the at least one task to complete the one or more transmissions, determining the duration of the delay period to be the specified maximum length of time.

9. A computer storage medium encoded with a computer program, the program comprising instructions that when executed by one or more computers cause the one or more computers to perform operations comprising:
   determining, by one or more processors, a likely aircraft departure time based on accessing a real-time flight schedule database;
   determining, by the one or more processors, a duration of a delay period for delaying activation of a mode of a mobile device in which the mobile device remains powered on, but in which one or more transmission functionalities of the mobile device are restricted, based, at least in part, on (i) a time required for at least one task to complete one or more transmissions using the transmission functionalities of the mobile device, (ii) a specified maximum length of time, and (iii) the likely aircraft departure time;
   delaying for the determined duration of the delay period, the activation of the mode of the mobile device in which the mobile device remains powered on, but in which the transmission functionalities of the mobile device are restricted; and
   after delaying activation of the mode for the determined duration of the delay period, activating the mode of the mobile device in which the mobile device remains powered on, but in which the transmission functionalities of the mobile device are restricted.

10. The medium of claim 9, wherein the duration of the delay period is determined based further on (i) an available bandwidth, (ii) a user preference, (iii) a synchronization status, or (iv) an urgency associated with the mode.

11. The medium of claim 9, wherein the duration of the delay period is determined further based on an amount of data remaining to be uploaded to or downloaded from a server.

12. The medium of claim 9, wherein activating the mode of the mobile device in which the mobile device remains powered on, but in which the transmission functionalities of the mobile device are restricted, comprises disabling the transmission functionalities of the mobile device by (i) disabling one or more hardware transmitters of the mobile device, or (ii) altering a state of one or more software applications running on the mobile device.

13. The medium of claim 9, wherein delaying, for the determined duration of the delay period, the activation of the mode of the mobile device in which the mobile device remains powered on, but in which the transmission functionalities of the mobile device are restricted, comprises delaying the activation of an airplane mode of the mobile device.

14. The medium of claim 9, wherein the operations comprise:
   receiving data indicating a user selection of the mode,
   wherein the mode is activated at least the determined duration of the delay period after receiving the data indicating the user selection of the mode.

15. A portable electronic device comprising:
   an input device;
   one or more processing devices; and
   a computer-readable medium having instructions stored thereon which, when executed by the one or more processing devices, cause the portable electronic device to perform operations comprising:
      determining, by one or more processors, a likely aircraft departure time based on accessing a real-time flight schedule database;
      determining, by the one or more processors, a duration of a delay period for delaying activation of a mode of a mobile device in which the mobile device remains powered on, but in which one or more transmission functionalities of the mobile device are restricted, based, at least in part, on (i) a time required for at least one task to complete one or more transmissions using the transmission functionalities of the mobile device, (ii) a specified maximum length of time, and (iii) the likely aircraft departure time;
      delaying for the determined duration of the delay period, the activation of the mode of the mobile device in which the mobile device remains powered on, but in which the transmission functionalities of the mobile device are restricted; and
      after delaying activation of the mode for the determined duration of the delay period, activating the mode of the mobile device in which the mobile device remains powered on, but in which the transmission functionalities of the mobile device are restricted.

16. The device of claim 15, wherein the mode comprises an airplane mode, and wherein the time required for at least one task to complete comprises a remaining time to complete an upload or a download.

17. The device of claim 15, wherein the duration of the delay period is determined further based on an amount of data remaining to be uploaded to or downloaded from a server.

18. The device of claim 15, wherein activating the mode of the mobile device in which the mobile device remains powered on, but in which the transmission functionalities of the mobile device are restricted, comprises disabling the transmission functionalities of the mobile device by (i) disabling one or more hardware transmitters of the mobile device, or (ii) altering a state of one or more software applications running on the mobile device.

\* \* \* \* \*